(12) United States Patent
Swanson et al.

(10) Patent No.: US 12,037,933 B2
(45) Date of Patent: Jul. 16, 2024

(54) DUAL-PURPOSE HEATER AND FLUID FLOW MEASUREMENT SYSTEM

(71) Applicant: WATLOW ELECTRIC MANUFACTURING COMPANY, St. Louis, MO (US)

(72) Inventors: Cal Swanson, St. Louis, MO (US); Mark D. Everly, St. Charles, MO (US); David P. Culbertson, Bristol, WI (US); James N. Pradun, Lake Geneva, WI (US); Jeremy J. Quandt, Winona, MN (US); Mark L. G. Hoven, Winona, MN (US); Jeremy Ohse, St. Louis, MO (US); Sanhong Zhang, Ballwin, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 202 days.

(21) Appl. No.: 16/884,771

(22) Filed: May 27, 2020

(65) Prior Publication Data

US 2020/0284179 A1 Sep. 10, 2020

Related U.S. Application Data

(63) Continuation of application No. 15/448,068, filed on Mar. 2, 2017, now Pat. No. 10,724,417.

(Continued)

(51) Int. Cl.
*F01N 9/00* (2006.01)
*F01N 3/023* (2006.01)
(Continued)

(52) U.S. Cl.
CPC ............ *F01N 9/005* (2013.01); *F01N 3/023* (2013.01); *F01N 3/027* (2013.01); *F01N 3/2006* (2013.01);
(Continued)

(58) Field of Classification Search
CPC .. F01N 11/002; F01N 11/005; F01N 13/0097; F01N 3/023; F01N 3/027;
(Continued)

(56) References Cited

U.S. PATENT DOCUMENTS 5,297,518 A * 3/1994 Cherry ................... F02B 19/12
123/260
6,470,741 B1 * 10/2002 Fathollahzadeh ..... G01F 1/6965
73/204.15

(Continued)

FOREIGN PATENT DOCUMENTS

JP       S6184563 A    4/1986
JP       H08122118 A   5/1996
(Continued)

OTHER PUBLICATIONS

Office Action issued in corresponding JP Application No. 2021-195296, issued Nov. 22, 2022, 4 pages.

(Continued)

*Primary Examiner* — Matthew T Largi
(74) *Attorney, Agent, or Firm* — Burris Law, PLLC (57) ABSTRACT

A control system for use in a fluid flow application includes a heater and a control device. The heater has at least one resistive heating element and the heater is operable to heat fluid. The control device determines at least one flow characteristic of a fluid flow based on a heat loss of the at least one resistive heating element and determines a mass flow rate of the fluid based on the at least one flow characteristic and a property of the at least one resistive heating element. And the property of the at least one resistive heating element includes a change in resistance of the at least one resistive heating element under a given heat flux density.

20 Claims, 3 Drawing Sheets

Related U.S. Application Data (60) Provisional application No. 62/302,482, filed on Mar. 2, 2016.

(51) Int. Cl.

| | | |
|---|---|---|
| *F01N 3/027* | (2006.01) | |
| *F01N 3/20* | (2006.01) | |
| *F01N 11/00* | (2006.01) | |
| *F01N 13/00* | (2010.01) | |
| *F02D 41/02* | (2006.01) | |
| *F02D 41/14* | (2006.01) | |
| *F02D 41/22* | (2006.01) | |
| *G01F 1/68* | (2006.01) | |
| *G01F 1/86* | (2006.01) | |
| *G01K 7/16* | (2006.01) | |
| *G01M 15/05* | (2006.01) | |
| *G05D 23/185* | (2006.01) | |
| *G05D 23/24* | (2006.01) | |
| *G05D 23/30* | (2006.01) | |
| *G07C 5/08* | (2006.01) | |
| *H05B 1/02* | (2006.01) | |
| *H05B 3/00* | (2006.01) | |
| *H05B 3/14* | (2006.01) | |
| *H05B 3/18* | (2006.01) | |
| *H05B 3/20* | (2006.01) | |
| *H05B 3/40* | (2006.01) | |
| *F01N 3/021* | (2006.01) | |
| *F01N 3/08* | (2006.01) | |
| *F01N 3/10* | (2006.01) | |
| *H01C 7/02* | (2006.01) | |
| *H01C 7/04* | (2006.01) | |

(52) U.S. Cl.
CPC ............ *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/12* (2013.01); *Y02T 10/40* (2013.01)

(58) Field of Classification Search
CPC ........ F01N 3/2006; F01N 3/2013; F01N 9/00; F01N 9/002; F02D 41/024; F02D 41/1446; F02D 41/1447; F02D 41/22; F02D 41/222; G01K 7/16; G01M 15/05; G05D 23/185; G05D 23/2401; G05D 23/30; G07C 5/0808; H05B 1/0227; H05B 1/0244; H05B 3/0042; H05B 3/40; G01F 1/68
See application file for complete search history.

(56) References Cited

U.S. PATENT DOCUMENTS

| | | | |
|---|---|---|---|
| 7,624,632 B1* | 12/2009 | Hoyle | G01F 1/6847 73/204.11 |
| 2003/0185270 A1* | 10/2003 | Kawai | G01F 1/6845 374/185 |
| 2004/0056321 A1* | 3/2004 | Parsons | G01F 23/248 374/E7.021 |
| 2007/0144250 A1* | 6/2007 | Ramsesh | G01F 25/15 73/204.22 |
| 2008/0047340 A1* | 2/2008 | Tokuyasu | G01F 1/699 73/204.23 |
| 2008/0178853 A1* | 7/2008 | Yamaoka | F02M 26/49 123/568.11 |
| 2009/0090177 A1* | 4/2009 | Sukegawa | G01F 15/04 73/204.25 |
| 2011/0226754 A1 | 9/2011 | Malone et al. | |
| 2013/0099931 A1* | 4/2013 | Wetherill | G01F 1/34 340/606 |
| 2014/0343747 A1* | 11/2014 | Culbertson | F01N 3/027 700/300 |
| 2015/0253169 A1* | 9/2015 | Najafi | G01F 1/698 228/180.5 |

FOREIGN PATENT DOCUMENTS

| | | |
|---|---|---|
| JP | 2005531770 A | 10/2005 |
| JP | 2009236792 A | 10/2009 |
| JP | 2011011933 A | 1/2011 |

OTHER PUBLICATIONS

Office Action issued in corresponding Japanese Patent Application No. 2018-545969 dated Sep. 6, 2022, 9 pages.

\* cited by examiner

DUAL-PURPOSE HEATER AND FLUID FLOW MEASUREMENT SYSTEM

CROSS-REFERENCE TO RELATED APPLICATIONS

This application is a continuation of U.S. patent application Ser. No. 15/448,068, filed on Mar. 2, 2017, which claims priority to and the benefit of U.S. Provisional Patent Application No. 62/302,482, filed on Mar. 2, 2016. The disclosures of the above applications are incorporated herein by reference. This application is also related to co-pending applications U.S. patent application Ser. No. 15/448,186, titled "Bare Heating Elements for Heating Fluid Flows"; U.S. patent application Ser. No. 15/447,942, titled "Virtual Sensing System"; U.S. patent application Ser. No. 15/447,964, titled "Heater Element As Sensor for Temperature Control in Transient Systems"; U.S. patent application Ser. No. 15/447,994, titled "Heater Element Having Targeted Decreasing Temperature Resistance Characteristics"; U.S. patent application Ser. No. 15/448,044, titled "System and Method for Axial Zoning of Heating Power"; U.S. patent application Ser. No. 15/448,162, titled "Heater-Actuated Flow Bypass"; U.S. patent application Ser. No. 15/448,108, titled "Susceptor for Use in a Fluid Flow System"; and U.S. patent application Ser. No. 15/448,130, titled "Thermal Storage Device for Use in a Fluid Flow System," all filed Mar. 2, 2017 and commonly assigned with the present application, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various aftertreatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

Heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to reduce and/or avoid failure of any of the heating elements. Therefore, the heating elements that are under the less harsh heating conditions are typically operated to generate a heat output that is much below their maximum available heat output.

SUMMARY

This section provides a general summary of the disclosure and is not a comprehensive disclosure of its full scope or all of its features.

In one form of the present disclosure, a control system for use in a fluid flow application is provided. The control system comprises a heater having at least one resistive heating element and the heater is operable to heat fluid. A control device that determines at least one flow characteristic of a fluid flow based on a heat loss of the at least one resistive heating element and determines a mass flow rate of the fluid based on the at least one flow characteristic and a property of the at least one resistive heating element is included. Also, the property of the at least one resistive heating element includes a change in resistance of the at least one resistive heating element under a given heat flux density.

In some variations the at least one resistive heating element includes a plurality of resistive heating elements provided along a fluid flow pathway, and the control device determines the at least one flow characteristic based on a heat loss and/or heat losses of the plurality of resistive heating elements. In such variations the control device can calculate an average fluid temperature, an average flow speed, or a combination thereof as the at least one flow characteristic based on the heat loss and/or heat losses of the plurality of resistive heating elements. In at least one variation, the at least one flow characteristic is selected from the group consisting of fluid speed, fluid pressure, fluid temperature, fluid turbulence, and combinations thereof. In some variations the control device determines a heat flux for each of at least two of the plurality of resistive heating elements. In such variations the control device can determine the heat flux for each of the at least two resistive heating elements using at least one of known fluid properties, known dimensions of the at least two resistive heating elements, and known dimensions of a flow channel adjacent the at least two resistive heating elements. Also, the control device can determine the heat flux for each of the at least two resistive heating elements using a calculated pressure at each of the at least two resistive heating elements and/or the control device re-calculates a temperature and a fluid flow rate at each of the at least two resistive heating elements as a function of the calculated pressure at each of the at least two resistive heating elements. In at least one variation the control device re-calculates a temperature and a fluid flow rate at each of the least two resistive heating elements as a function of a difference in calculated pressures between the at least two resistive heating elements.

In some variations the control device re-calculates a temperature and a fluid flow rate at each of the at least two resistive heating elements as a function of the calculated pressure at each of the at least two resistive heating elements and as a function of a difference in calculated pressures between the at least two resistive heating elements.

In at least one variation of the present disclosure, the at least one flow characteristic is selected from the group consisting of fluid speed, fluid pressure, fluid temperature, fluid turbulence, and combinations thereof.

In some variations the heater further comprises ceramic insulation surrounding the at least one resistive heating element and a metal sheath surrounding the ceramic insulation.

In at least one variation the control device is operable to receive the at least one fluid flow characteristic from the at least one resistive heating element and fluid flow characteristics from an engine control module to determine heater performance of the heater and mass flow measurement performance in the engine control module. In such variations the control device can be operable to determine inconsistencies between the at least one fluid flow characteristic received from the at least one resistive heating element and fluid flow characteristics received from the engine control module.

In another form of the present disclosure, a control system for use with a vehicle exhaust system comprising a heater having at least one resistive heating element and a control device is provided. The heater is operable to heat an exhaust gas and the control device determines at least one flow characteristic of the exhaust gas based on a heat loss of the at least one resistive heating element and determines a mass flow rate of the exhaust gas based on the at least one flow characteristic and a property of the at least one resistive heating element. The at least one flow characteristic is selected from the group consisting of exhaust gas flow speed, exhaust gas pressure, exhaust gas temperature, exhaust gas turbulence, and combinations thereof, and the property of the at least one resistive heating element includes a change in resistance of the at least one resistive heating element under a given heat flux density.

In some variations the at least one resistive heating element includes a plurality of resistive heating elements provided along an exhaust gas flow pathway, and the control device determines at least one flow characteristic based on a heat loss and/or heat losses of the plurality of resistive heating elements.

In at least one variation the control device determines a heat flux for each of at least two of the plurality of resistive heating elements. In such variations, the control device can determine the heat flux for each of the at least two resistive heating elements using at least one of known exhaust gas properties, known dimensions of the at least two resistive heating elements, and known dimensions of an exhaust pipe adjacent the at least two resistive heating elements. Also, the control device can determine the heat flux for each of the at least two resistive heating elements using a calculated pressure at each of the at least two resistive heating elements. And In at least one variation the control device re-calculates a temperature and a fluid flow rate at each of the at least two resistive heating elements as a function of the calculated pressure at each of the at least two resistive heating elements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
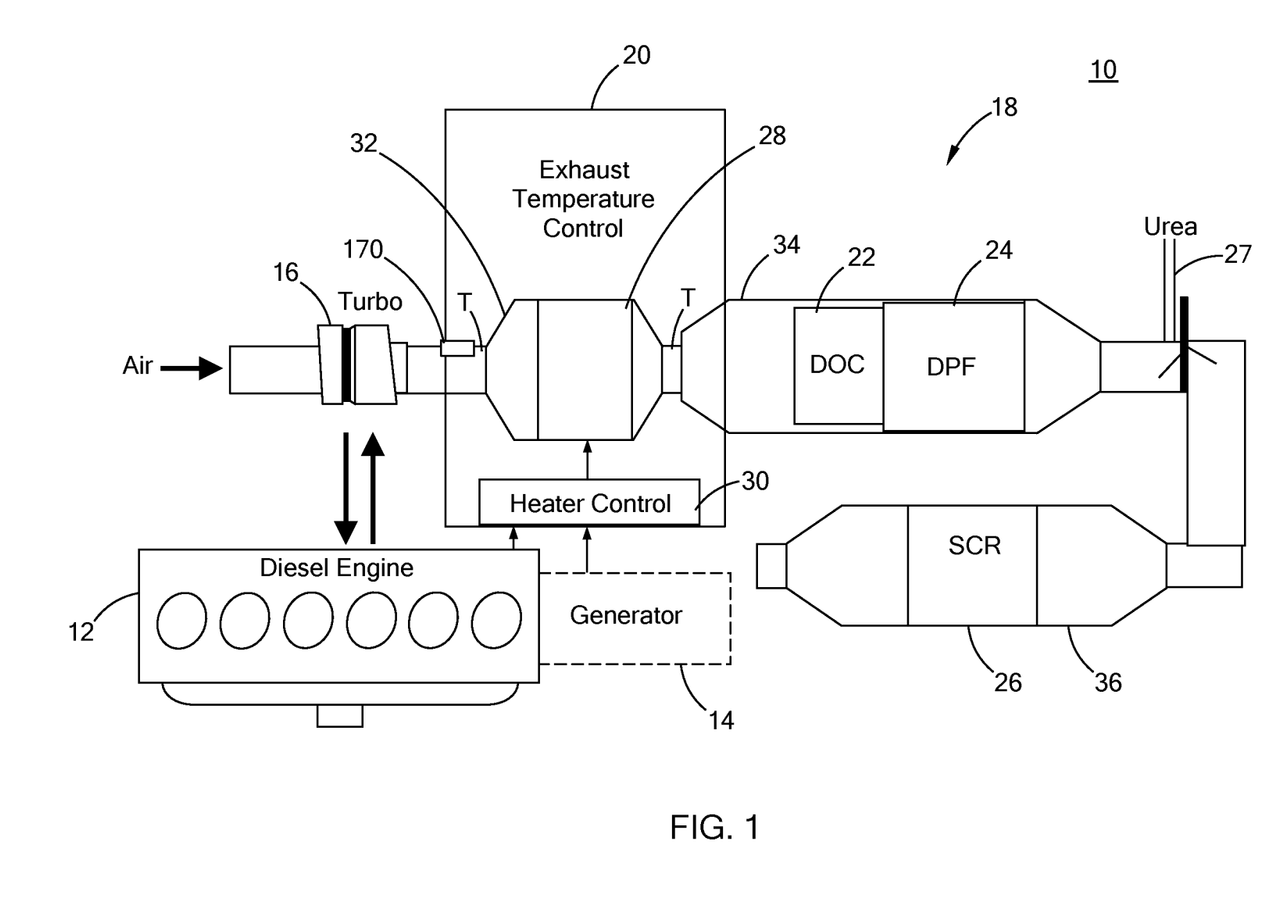
FIG. 1 is a schematic diagram of a diesel engine and exhaust aftertreatment system in which the principles of the present disclosure are applied.

Referring to FIG. 1, an engine system 10 generally includes a diesel engine 12, an alternator 14 (or generator in some applications), a turbocharger 16, and an exhaust aftertreatment system 18. The exhaust aftertreatment system 18 is disposed downstream from the turbocharger 16 for treating exhaust gases from the diesel engine 12 before the exhaust gases are released to atmosphere. The exhaust aftertreatment system 18 may include one or more additional components, devices, or systems operable to further treat exhaust fluid flow to achieve a desired result. In one form, the exhaust aftertreatment system 18 includes a heating system 20, a diesel oxidation catalyst (DOC) 22, a diesel particulate filter (DPF) 24, and a selective catalytic reduction device (SCR) 26. The heating system 20 includes a heater assembly 28 disposed upstream from the DOC 22, and a heater control device 30 for controlling operation of the heater assembly 28. The exhaust aftertreatment system 18 includes an upstream exhaust conduit 32 that receives the heater assembly 28 therein, an intermediate exhaust conduit 34 in which the DOC 22 and DPF 24 are received, and a downstream exhaust conduit 36 in which the SCR 26 is disposed. Although a diesel engine 12 is shown, it should be understood that the teachings of the present disclosure are also applicable to a gasoline engine and other fluid flow applications. Therefore, the diesel engine application should not be construed as limiting the scope of the present disclosure.

The DOC 22 is disposed downstream from the heater assembly 28 and serves as a catalyst to oxide carbon monoxide and any unburnt hydrocarbons in the exhaust gas. In addition, the DOC 22 converts nitric oxide (NO) into nitrogen dioxide ($NO_2$). The DPF 24 is disposed downstream from the DOC 22 to remove diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 26, NOx is reduced into $N_2$, $H_2O$ and $CO_2$.

It should be understood that the engine system 10 illustrated and described herein is merely exemplary, and thus other components such as a $NO_x$ adsorber or ammonia oxidation catalyst, among others, may be included, while other components such as the DOC 22, DPF 24, and SCR 26 may not be employed. Further, although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

Figure 2:
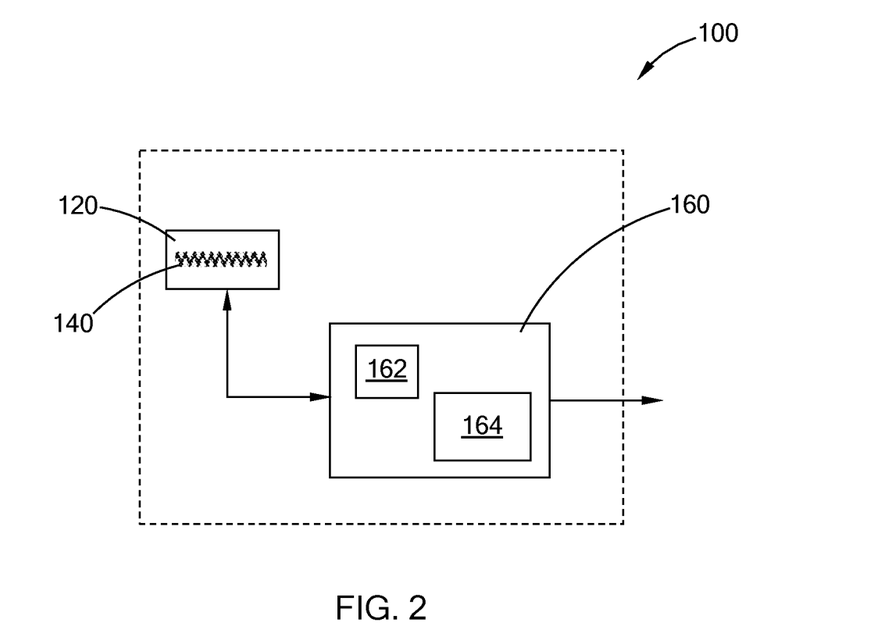
FIG. 2 is a block diagram of a control system in accordance with the teachings of the present disclosure.

Referring also to FIG. 2, a block diagram of one form of a control system 100 for use in a fluid flow application is shown in accordance with the present disclosure. The control system 100 adapted for use with the engine system 10 of FIG. 1, or other applications while remaining within the scope of the present disclosure. Particularly, the heating system 20 is operable with the control system 100. The control system 100 includes a heater 120 having at least one resistive heating element 140 and a control device 160. The heater 120 in one form is incorporated into heater assembly 28, where control device 160 corresponds to heater control device 30. The heater 120 having at least one resistive heating element 140 is adapted to heat fluid flow and thus is located within or proximate a flow of fluid, such as by way of example, the exhaust gases in the exhaust aftertreatment system 18.

In one form, the control system 100 includes a control device 160 that uses heat loss from at least one resistive heating element 140 to determine flow characteristics of the fluid flow. The control device 160 may, by way of example, be a power controller having a switching device 162 for providing power to the heater 120 and for receiving resistance data from the resistive heating element 140 to determine flow characteristics as set forth herein. The control device 160 also includes a microcontroller 164 that processes data in order to switch power to the heater 120 and also to send output from the control system 100 to an external processing device (not shown) for further control of the fluid flow.

The heater 120 is adapted to heat the fluid flow or exhaust gases while also providing certain flow measurements. Accordingly, the heater 120 functions as a "primary heater" that influences temperature of the fluid flow or the exhaust gas temperature in exhaust applications as described herein. The control device 160 uses heat loss, or a change in resistance, of at least one resistive heating element 140 to determine mass flow rate of the exhaust gas based on flow characteristics of the fluid flow. These flow characteristics may include, by way of example, temperature of the fluid flow, speed of the fluid flow, velocity of the fluid flow, geometry of a passageway for the fluid flow, pressure of the fluid flow, density of the fluid flow, and combinations thereof. It should be understood that either speed or velocity of the fluid flow may be used, depending on whether or not magnitude and direction of the fluid flow are desired. The flow characteristics are more generally fluid pressure, fluid temperature, fluid turbulence, and combinations thereof. Based on resistance data received from the heater 120, the control system 100 calculates mass flow rate of a fluid based on cooling rate of the resistive heating elements 140. Generally, the information needed for mass flow is fluid speed, fluid temperature, geometry of a passageway and fluid density. For a given heater, the geometry is known and generally fixed. Fluid speed is thus determined based on the resistance information from the resistive heating elements and inlet temperature. Fluid density could be determined through fluid temperature and pressure, or it could be derived from a map of engine conditions and temperature.

The resistive heating element 140 may be a resistive wire that can be electrically heated to a temperature higher than the fluid whose flow rate is to be measured. When the fluid flows across the heated resistive wire, the fluid has a cooling effect on the resistive wire. The electrical resistance of many metals is dependent on temperature. When the temperature of the resistive wire decreases, the electrical resistance of the resistive wire also changes. Accordingly, a relationship between the resistance of the wire and the flow speed can be obtained. Therefore, the heating wire can also be used to measure flow rate of a fluid. The resistive heating element 140 of the heater 120 can be used to both heat the exhaust gas and measure the flow rate of the exhaust gas. Information regarding fluid flow characteristics may also be used for diagnostic purposes.

The flow speed can be determined based on change in resistance of the resistive heating element 140 under a given heat flux density. The flow speed can also be converted to mass flow rate according to a calculation based on temperature of the flow, the geometry of the flow channel, and the density of the flow. For a given heater 120, the geometry of the flow channel is known and generally fixed. The density of the flow can be derived from pressure, temperature and the ideal gas law:

PV=nRT, where:
P=pressure of the gas
V=volume of the gas
n=amount of substance of gas
R=Avogadro constant
T=absolute temperature of the gas Alternatively, the density of the flow can be derived from a map of engine conditions and temperature. Accordingly, the control device 160 can determine mass flow rate based on the flow speed.

Regarding the specific heater construction, the resistive heating element 140 may be directly exposed to the fluid flow or be isolated from the fluid flow. In one form, and referring to FIG. 3, the heater 120 may be a tubular heater 120', which includes the resistive heating element 140' surrounded by an insulation material 145 (typically compacted MgO), and then surrounded by a sheath 150. The tubular heater 120' also may include power pins 152 and seals 154 as shown. It should be understood, however, that the heater 120 may be a cable heater, a cartridge heater, a flexible heater, or a layered heater, among others while remaining within the scope of the present disclosure. Accordingly, illustration of a tubular heater 120' should not be construed as limiting the scope of the present disclosure.

Figure 3:
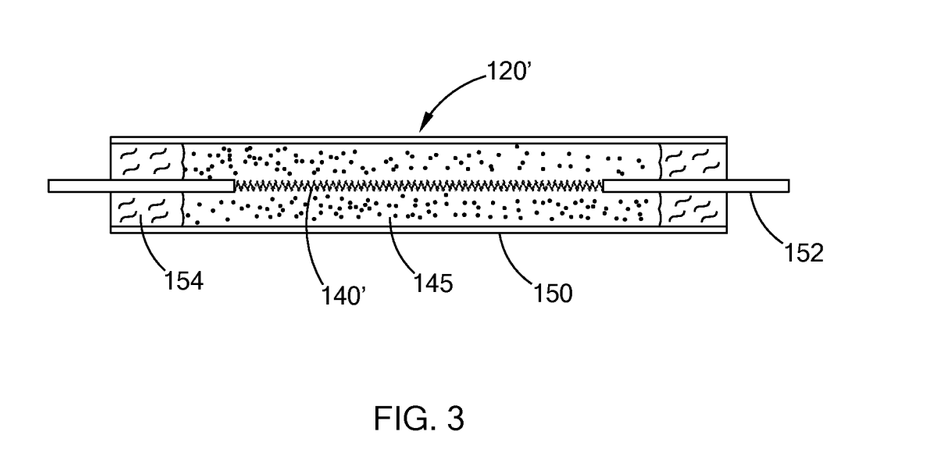
FIG. 3 is a cross-sectional view of a tubular heater constructed in accordance with the teachings of the present disclosure.

In many instances, the thermal mass of the heater 120 that includes the resistive heating element 140 and any protecting or insulating layers can be used to characterize the relationship between the measured resistance of the resistive heating element 140 and the fluid flow rate.

In one form where the resistive heating element 140 has a large portion extending into the exhaust gas stream and its temperature varies at different portions of the resistance heating element 140, an average of these temperatures can be used. Therefore, the calculated resulting flow rate is an average flow rate.

Since fluid speed is determined based on a measurement of temperature of the resistive heating element 140 via resistance, the temperature of the incoming fluid flowing toward the heater 120 will affect the measurement. Referring back to FIG. 1, in some cases, in order to provide an improved measurement, an upstream temperature sensor 170 can be used to provide information for calculation of the flow speed and consequently the mass flow.

Figure 4A:
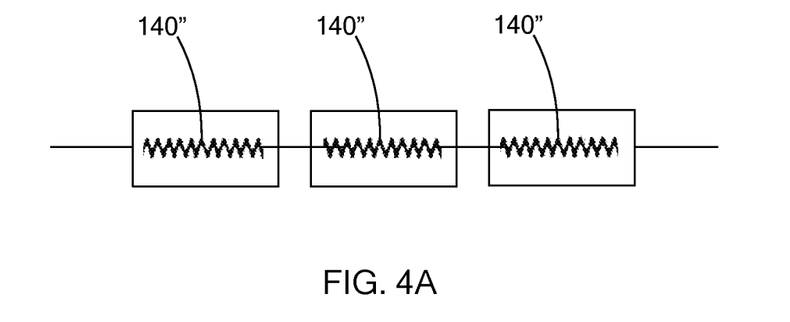
FIG. 4A is a schematic view of a plurality of successive resistive heating elements in accordance with the teachings of the present disclosure.
Figure 4B:
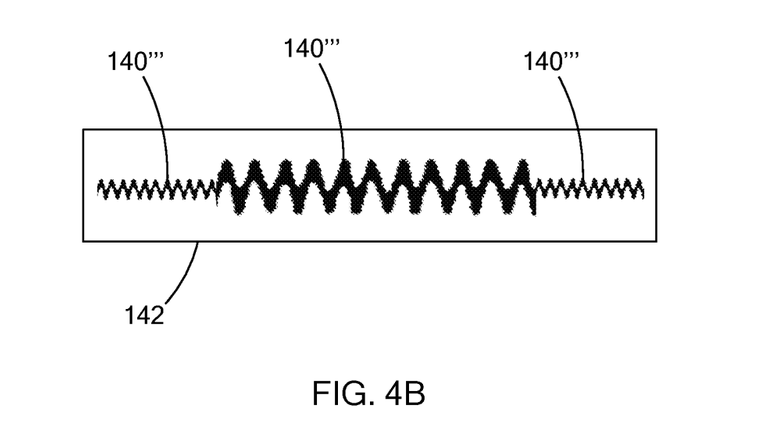
FIG. 4B is a schematic view of a plurality of resistive heating elements in accordance with the teachings of the present disclosure.

In another form, the heater 120 includes a plurality of resistive heating elements 140. This can be especially helpful where an upstream temperature sensor 170 is not available or where its addition would add undesirable cost or complication to achieve the desired accuracy. Referring to FIGS. 4A and 4B, the heater 120 can have successive resistive heating elements 140" and/or a plurality of resistive heating elements 140''' within the same housing 142. The resistive heating elements 140 are thus positioned along the flow direction as anemometers to provide sufficient fluid flow characteristics for calculating both an average temperature and an average flow speed. This configuration can thus give rise to two simultaneous equations for heat flux from the resistive heating elements 140"/140''' as related to incoming temperature and flow speed. By accounting for energy added to the flow by upstream resistive heating elements 140"/140''' (and adjusting the temperature and flow speed calculations at the downstream element used as an anemometer accordingly), the two equations for the two unknown variables can be solved. This is based on the assumption that other variables in the heat flux equations are known through system design, such as fluid properties, dimensional information of the resistive heating elements 140"/140''' and of the flow channel immediately adjacent to the resistive heating elements 140"/140''', surface roughness information, and the behavior of the flow at various conditions as related to the shape of the surfaces of the resistive heating elements 140"/140''' as well as the adjacent surfaces. This calculation can be improved by including the calculated temperature and flow rate to create estimates of the pressure at each resistive heating element 140"/140''' and to re-calculate the temperature and flow rate including the effect of the pressure and the difference in pressure of the flow between two adjacent resistive heating elements 140"/140'''. It should be understood that the schematic depictions shown in FIGS. 4A and 4B do not limit the resistive heating elements 140 to a specific circuit configuration, and thus series and/or parallel circuit configurations may be employed while remaining within the scope of the present disclosure.

For systems such as a diesel engine as shown in FIG. 1, which has an engine control module (ECM) that provides digital communication of mass flow, the control device 160 can receive the mass flow value determined from the heater 120 and compare it against the data received from the ECM. Therefore, the control device 160 can be used as a diagnostic tool to determine any change in heater performance or any change in the ECM mass flow measurement performance. When inconsistency is found between the data from the ECM and the data measured by the resistive heating element 140 as an anemometer, the engine can be switched to a "limp" mode where the power to the heater 120 or the engine outputs are reduced to preserve the durability of the system. In one form of the present disclosure, a malfunction indicator lamp (MIL) can be activated to provide a warning to a user.

In addition, the heater 120 as an anemometer can also be used as a diagnostic tool to determine if deposits are formed on the resistive heating elements 140, if the resistive heating elements 140 are directly exposed to the fluid flow, or if deposits are formed on the heater 120. When deposits are formed on the heater 120 or the heater performance is affected by other factors, the thermal mass of the heater 120 may be changed. The control device 160 can determine the conditions of a resistive heating element 140 by comparing the cooling rate or heating rate measured by the resistance wire against the mass flow rate data from the ECM.

There is generally a thermal lag from the time when a resistive heating element 140 is turned on to the time the resistive heating element 140 starts to heat the fluid flowing past the resistive heating element 140. The initial rate of heating can be compared against the mass flow data from the ECM to provide an in-situ characterization of the thermal masses and thermal resistances of the heater 120. This information can be used by the control device 160 to improve control for transient applications.

In addition, the resistive heater 120 as an anemometer can also be used as a temperature sensor. Therefore, the resistive heating element 140 serves three (3) functions: heating, measurement of fluid flow rate, and measurement of temperature of the heating element/fluid. As the resistance of the resistive heating element 140 changes with temperature, the temperature of the resistive heating wire can be determined based on the change in resistance. In addition, for a material with a non-monotonic relationship of resistance and temperature, the slope of the change in resistance and/or determination of the inflection points in the non-monotonic curve when the heater 120 is not powered can provide an indication as to which portion of the curve applies to a particular temperature. This information can be used to enable the measurement system to determine which temperature value to equate with a particular resistance (since if non-monotonic, could have an identical resistance at multiple temperatures), or when coupled with resistance wire or heater sheath, thermal models can be used to identify changes in the R-T (resistance-temperature) curve over time, providing information for the characteristic to be updated and enabling better temperature control.

As an alternative to measuring temperature when the heater 120 is not powered, the control device 160 facilitates the determination of a temperature range by incrementally changing the power level applied to the resistive heating element 140 and examining the system response as it is operated. In this example, any incremental increase in power should result in a corresponding increase in resistance for element materials with positive dR/dT and a decrease in resistance for materials with a negative dR/dT in the operating temperature range. Similar approaches can be used to clarify the flow conditions/boundary layer characteristics and thereby allow a refinement of the model-based control of the heater 120 as a sensor (i.e. using a model of the system behavior to control the heater 120 in a way that enhances the accuracy of the resistive heating element 140 as a sensor).

In yet another form, periodic incremental changes in power level to the resistive heating element 140 can be used for other purposes. One example includes a control algorithm where the heater 120 is operated at P−Pi for time T0 to T1 and at P+Pi for time T1 to T2 (where P is the desired power level for the heater 120 and Pi is an increment of power, and where T0=T2−T1 and where T1 is a small fraction of the time constants associated with system operation [i.e. where T1 is a small time increment as compared to the time associated with any significant or important changes to the volumetric flow rate or the average bulk flow temperature]). With this method, the resistance of the resistive heating element 140 can be measured at T1 and at T2 and combined with a model of the transient behavior of the element temperature to determine heat flux at T1 and at T2. These two values of heat flux could then be used to create two simultaneous equations for determination of flow rate and flow temperature during the range of time spanning T0 to T2.

This measurement can be compared against the gas mass flow data from an ECM to determine any drifting of the resistance/temperature curve over time. This information can be used to update dynamic control, or to predict heater useful life.

Since the heater 120 as an anemometer can be used for both heating and mass flow measurement, the heater 120 can be connected to an external control device (not shown) using only two wires for transmitting mass flow information to the external control device and for supply power from the external control device to the heater 120.

The heater 120 as an anemometer has the following advantages when comparing the measurement against the data from the ECM or another sources:

1. Providing a diagnosis of the heater performance;
2. Determining whether deposits are formed on the resistive heating element 140;
3. Providing in-situ characterization of the heater thermal mass;
4. Helping to resolve the temperature of a heating element 140 that has a non-monotonic resistance/temperature characteristic;
5. Helping to identify changes or drift in the temperature characteristic over time; and
6. Helping to identify where flow is faster or slower to prevent overheating in "dead zones," and also in applications with multiple radial zones.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for use in a fluid flow application having a fluid flow pathway, the control system comprising:
   a heater having at least one resistive heating element, the heater operable as a primary heater to heat and influence a temperature of fluid provided in the fluid flow pathway and operable to measure an electrical characteristic of the at least one resistive heating element, wherein the electrical characteristic includes a resistance of the at least one resistive heating element; and
   a controller configured to:
      calculate a heat flux based on a change in resistance of the at least one resistive heating element;
      determine at least one flow characteristic of the fluid flowing in the fluid flow pathway based on the heat flux; and
      determine a mass flow rate of the fluid based on the at least one flow characteristic.

2. The control system according to claim 1, wherein the at least one resistive heating element includes a plurality of resistive heating elements provided along the fluid flow pathway, and the controller is configured to determine the at least one flow characteristic based on heat loss of the plurality of resistive heating elements.

3. The control system according to claim 2, wherein based on the heat loss of the plurality of resistive heating elements, the controller is configured to calculate an average fluid temperature, an average flow speed, or a combination thereof as the at least one flow characteristic.

4. The control system according to claim 2, wherein the at least one flow characteristic is selected from the group consisting of fluid speed, fluid pressure, fluid temperature, fluid turbulence, and combinations thereof.

5. The control system according to claim 2, wherein the controller is configured to determine calculate the heat flux for each of at least two of the plurality of resistive heating elements.

6. The control system according to claim 5, wherein the controller is configured to calculate the heat flux for each of the at least two resistive heating elements using at least one of known fluid properties, known dimensions of the at least two resistive heating elements, and known dimensions of a flow channel adjacent the at least two resistive heating elements.

7. The control system according to claim 6, wherein the controller is configured to calculate the heat flux for each of the at least two resistive heating elements using a calculated pressure at each of the at least two resistive heating elements.

8. The control system according to claim 7, wherein the controller is further configured to re-calculate a temperature and a fluid flow rate at each of the at least two resistive heating elements as a function of the calculated pressure at each of the at least two resistive heating elements.

9. The control system according to claim 7, wherein the controller is further configured to recalculate a temperature and a fluid flow rate at each of the at least two resistive heating elements as a function of a difference in calculated pressures between the at least two resistive heating elements.

10. The control system according to claim 7, wherein the controller is further configured to re-calculate a temperature and a fluid flow rate at each of the at least two resistive heating elements as a function of the calculated pressure at each of the at least two resistive heating elements and as a function of a difference in calculated pressures between the at least two resistive heating elements.

11. The control system according to claim 1, wherein the at least one flow characteristic is selected from the group consisting of fluid speed, fluid pressure, fluid temperature, fluid turbulence, and combinations thereof.

12. The control system according to claim 1, wherein the heater further comprises ceramic insulation surrounding the at least one resistive heating element and a metal sheath surrounding the ceramic insulation.

13. The control system according to claim 1, wherein the controller is further configured to receive the at least one flow characteristic from the at least one resistive heating element and flow characteristics from an engine control module to determine heater performance of the heater and mass flow measurement performance in the engine control module.

14. The control system according to claim 13, wherein the controller is further configured to determine inconsistencies between the at least one flow characteristic received from the at least one resistive heating element and the flow characteristics received from the engine control module.

15. A control system for use with a vehicle exhaust system having an exhaust gas flow pathway, the control system comprising:
a heater having at least one resistive heating element, the heater being operable as a primary heater to heat and influence a temperature of an exhaust gas provided in the exhaust gas pathway and operable to measure an electrical characteristic of the at least one resistive heating element, wherein the electrical characteristic includes a resistance of the at least one resistive heating element; and
a controller configured to:
calculate a heat flux based on a change in resistance of the at least one resistive heating element;
determine at least one flow characteristic of the exhaust gas flowing in the exhaust gas flow pathway based on the heat flux; and
determine a mass flow rate of the exhaust gas based on the at least one flow characteristic,
wherein the at least one flow characteristic is selected from the group consisting of exhaust gas flow speed, exhaust gas pressure, exhaust gas temperature, exhaust gas turbulence, and combinations thereof.

16. The control system according to claim 15, wherein the at least one resistive heating element includes a plurality of resistive heating elements provided along the exhaust gas flow pathway, and the controller is configured to determine the at least one flow characteristic based on heat loss of the plurality of resistive heating elements.

17. The control system according to claim 16, wherein the controller is configured to calculate the heat flux for each of at least two of the plurality of resistive heating elements.

18. The control system according to claim 17, wherein the controller is configured to calculate the heat flux for each of the at least two resistive heating elements using at least one of known exhaust gas properties, known dimensions of the at least two resistive heating elements, and known dimensions of an exhaust pipe adjacent the at least two resistive heating elements.

19. The control system according to claim 18, wherein the controller is configured to calculate the heat flux for each of the at least two resistive heating elements using a calculated pressure at each of the at least two resistive heating elements.

20. The control system according to claim 19, wherein the controller is configured to re-calculate a temperature and a fluid flow rate at each of the at least two resistive heating elements as a function of the calculated pressure at each of the at least two resistive heating elements.

* * * * *